US012001323B2

(12) United States Patent
Verma et al.

(10) Patent No.: US 12,001,323 B2
(45) Date of Patent: Jun. 4, 2024

(54) TEST RECORDER FOR API UNIT TESTING

(71) Applicant: salesforce.com, inc., San Francisco, CA (US)

(72) Inventors: Sanjna Verma, San Francisco, CA (US); Matias Pentreath, Buenos Aires (AR); Leandro Emmanuel Reina Kiperman, Buenos Aires (AR); Julian Pascual, Buenos Aires (AR); Fernando Thea, Buenos Aires (AR); Facundo Ezequiel Poblete, Buenos Aires (AR); Diego Martin Strubolini, San Diego, CA (US); Pablo Damian La Greca, Buenos Aires (AR)

(73) Assignee: salesforce.com, inc., San Francisco, CA (US)

(*) Notice: Subject to any disclaimer, the term of this patent is extended or adjusted under 35 U.S.C. 154(b) by 103 days.

(21) Appl. No.: 17/587,009

(22) Filed: Jan. 28, 2022

(65) Prior Publication Data

US 2022/0300402 A1    Sep. 22, 2022

Related U.S. Application Data

(60) Provisional application No. 63/164,313, filed on Mar. 22, 2021.

(51) Int. Cl.
*G06F 11/36* (2006.01)

(52) U.S. Cl.
CPC ...... *G06F 11/3684* (2013.01); *G06F 11/3688* (2013.01)

(58) Field of Classification Search
None
See application file for complete search history.

(56) References Cited

U.S. PATENT DOCUMENTS

| 7,958,497 | B1* | 6/2011 | Lindo | G06F 11/3632 |
| | | | | 714/799 |
| 10,628,764 | B1* | 4/2020 | Kaplan | G06Q 10/063112 |
| 2007/0022407 | A1* | 1/2007 | Givoni | G06F 11/3688 |
| | | | | 717/124 |
| 2012/0246621 | A1* | 9/2012 | Mukkavilli | G06F 11/3684 |
| | | | | 717/126 |

(Continued)

OTHER PUBLICATIONS

"Apache JMeter HTTP(S) Test Script Recorder"; Apache.org website as captured by The Wayback Machine Internet Archive (archive.org) on Mar. 1, 2021 (Year: 2021).*

(Continued)

*Primary Examiner* — Wei Y Zhen
*Assistant Examiner* — Clint Thatcher
(74) *Attorney, Agent, or Firm* — Sterne, Kessler, Goldstein & Fox P.L.L.C.

(57) ABSTRACT

Disclosed herein are system, method, and computer program product embodiments for generating a unit test for an API or integration of an application by recording a flow of an input through a plurality of message processors of the application. A developer can then view an outline of the recorded flow in a menu, from which the developer can select an individual processor within the recorded flow. By selecting an individual processor, options particular to that processor can be presented to the developer to allow them to control behaviors of the unit test or to validate results.

20 Claims, 13 Drawing Sheets

(56) References Cited

U.S. PATENT DOCUMENTS

| | | | |
|---|---|---|---|
| 2014/0344785 A1* | 11/2014 | Bilgory | G06F 11/3684 |
| | | | 717/124 |
| 2018/0267887 A1* | 9/2018 | Dsouza | G06F 40/30 |
| 2020/0192790 A1* | 6/2020 | Elges | G06F 11/368 |
| 2022/0012168 A1* | 1/2022 | Challa | G06F 11/3688 |

OTHER PUBLICATIONS

Simon Lawrence; "How do I Write Apex Tests for Salesforce Flows and Process Builders?"; Desynit.com website; Nov. 8, 2018 (Year: 2018).*

* cited by examiner

Configure Test

The flow from your Mule application is displayed in the Flow Outline panel. Select a processor and apply test actions to it.

- ▽ ⊙ implementation : *Mule Configuration*
  - ▽ ○ getFlights : *Flow*
    - ● airline : *Set Variable*
    - ● setCode : *Flow Reference*
    - ● Is valid destination : *Is true*
    - ▽ ○ Choice : *Choice*
      - ▽ ○ #[vars.airline == "del... : *when*
        - ● getDeltaFlights : *Flow Reference*
      - ● [Flight] to JSON : *Transform Message*
      - ● Logger : *Logger* getFlights
MUnit Test

Select a test action to perform on this processor when the test is executed

○ Set input and assert output
This test will save the initial Mule event and resulting output event from your flow. When the test runs, it sets the recorded input as the test input, and asserts that the flow output matches the recorded output, according to the configuration below.
Learn more

| Flow Input | Flow Output |

Set: ☑ Payload  ☑ Attributes  ☑ Variables

Payload: **as Binary {base: "64"}
▽ Attributes: Object
  ▷ "headers" : Object
    "clientCertificate" : null
    "method" : "GET"
    "scheme" : "http"
  ▷ "queryParams" : Object
    "requestUri" : "api/flights?code=SFO&airline=delta"
    "queryString" : "code=SFO&airline=delta"
    "version" : "HTTP/1.1"
    "maskedRequestPath" : "/flights"
    "listenerPath" : "/api/*"
    "relativePath" : "/api/flights"
    "localAddress" : "127.0.0.1:8081"
    "uriParams" : *Empty Object*
    "rawRequestUri" : "api/flights?code=SFO&airline=delta"
    "rawRequestPath" : "/api/flights"
    "remoteAddress" : "127.0.0.1:54565"
    "requestPath" : "api/flights"

[ < Back ]  [ Next > ]  [ Cancel ]  [ Finish ]

Configure Test
The flow from your Mule application is displayed in the Flow Outline panel. Select a processor and apply test actions to it.

▽ ⛁ implementation : *Mule Configuration*
  ▽ ○ getFlights : *Flow*
    ● airline : *Set Variable*
    ● setCode : *Flow Reference*
    ● Is valid destination : *Is true*
    ▽ ○ Choice : *Choice*
      ▽ ○ #[vars.airline == "del...." when
        ● getDeltaFlights : *Flow Reference*
      ● [Flight] to JSON : *Transform Message*
    ● Logger : *Logger*

702 airline
MUnit Test
Select a test action to perform on this processor when the test is executed ○ Do not perform any test actions
○ Mock this processor
● Verify that this processor was called ⎯⎯ 704
○ Spy this processor ✓ Verify call
This operation will set a Validation to make sure this step was executed.
Learn more
Verification condition  [ at most / at least / ✓ equal to ] [ 1 time(s) ]  ⎯⎯ 706
This step should run

Behavior

Here's a summary of the test that will be automatically generated for your project
Learn more All the preconditions to be set before executing the test logic.
- Mock          airline
- Spy           Is valid destination
- Before
  - Assertion(s)    Is valid destination
- After
  - Assertion(s)    Is valid destination
- Set Event    Flow: getFlights

Execution

Testing logic which will wait for all processes to finish before running the validations
- Flow Ref    Flow: getFlights

Validation

The validations for the results of the execution.
- Assertion(s)    Flow: getFlights
- Verify          Is valid destination

FIG. 9

TEST RECORDER FOR API UNIT TESTING

CROSS-REFERENCE TO RELATED APPLICATIONS

This application claims the benefit of U.S. Provisional Patent Application No. 63/164,313, filed Mar. 22, 2021, and entitled "Test Recorder for API Unit Testing," the entirety of which is hereby incorporated by reference.

BACKGROUND

When developing a new application programming interface (API) for a web service, it is important to develop a unit test for the API to ensure that it operates as expected. Developing a unit test can be a time consuming and potentially challenging process, requiring a developer to think about the format and content of possible inputs, generate mocks for various processors, and isolate the flows being tested as much as possible from other flows.

Accordingly, what is needed are approaches to simplify the development of unit tests for APIs.

BRIEF DESCRIPTION OF THE DRAWINGS

The accompanying drawings are incorporated herein and form a part of the specification.

FIG. 6 is an exemplary UI depicting a test configuration dialog, in accordance with an embodiment.

FIG. 7 is an exemplary UI depicting a configuration of a set variable message processor, in accordance with an embodiment.

FIG. 9 is an exemplary UI depicting a summary page of a generated test configured from a test recording, in accordance with an embodiment.

In the drawings, like reference numbers generally indicate identical or similar elements. Additionally, generally, the left-most digit(s) of a reference number identifies the drawing in which the reference number first appears.

DETAILED DESCRIPTION

Figure 1:
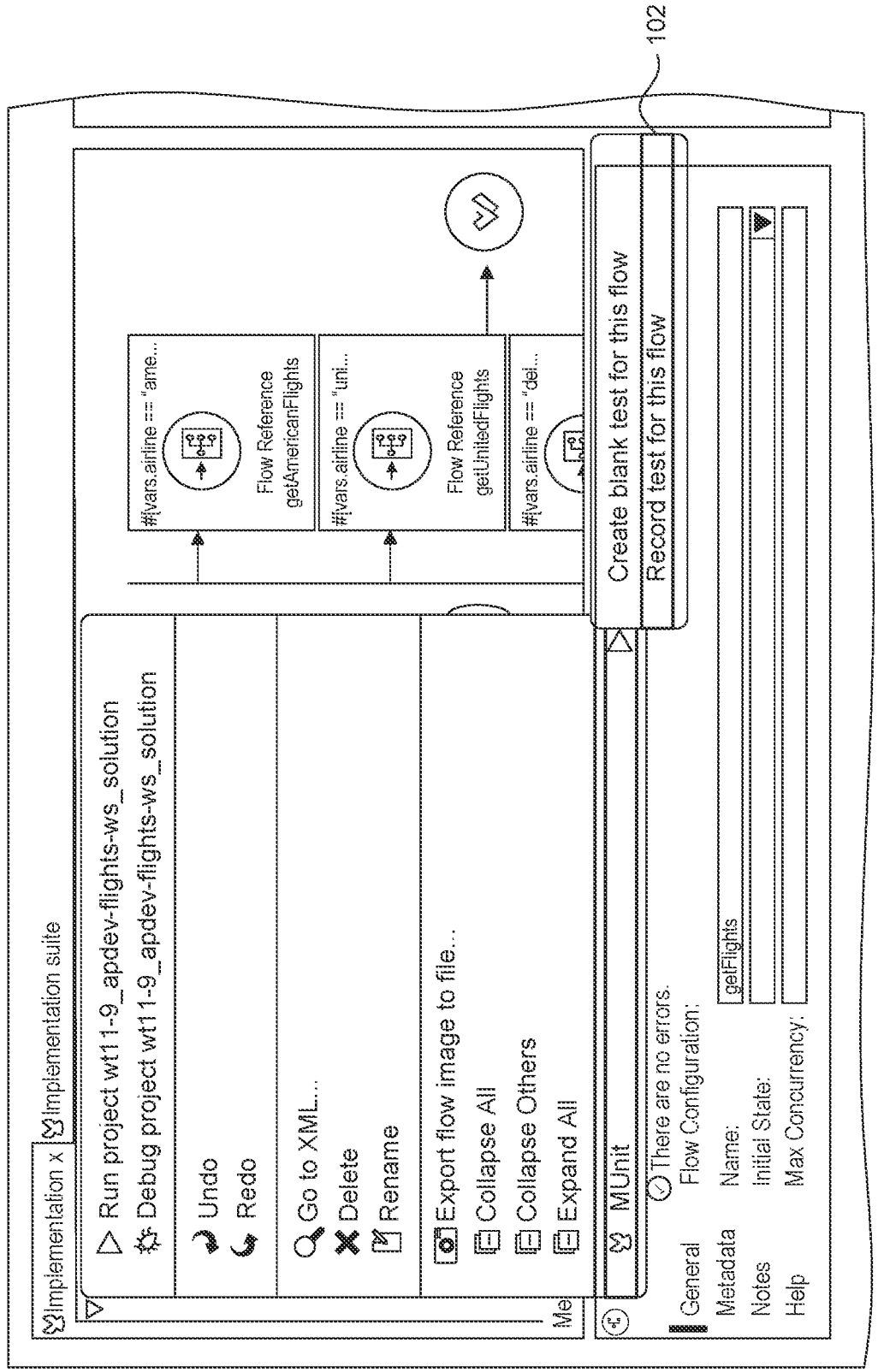
FIG. 1 is an exemplary user interface (UI) depicting initiation of a test recorder, in accordance with an embodiment.

Provided herein are system, apparatus, device, method and/or computer program product embodiments, and/or combinations and sub-combinations thereof, for providing a test recorder to generate unit tests for an application programming interface (API) for a web service.

When building an API, developers define message processors (or simply "processors") that handle transforming, filtering, or other processing of messages from a message source. Non-limiting examples of message processors include connectors to send and receive data, and plug into external data sources via standard protocols or third-party APIs; components, which are flexible tools that perform business logic implemented in Java, Javascript, Groovy, Python, or Ruby; filters, which only allow certain messages to continue to be processed in a flow based on certain criteria; routers, which control message flow to route, resequence, or split and aggregate messages in a flow; scopes, which wrap snippets of code to define fine-grained behavior within a flow; transformers, which convert message payload type and data format to facilitate communication between systems; exception strategies, which handle any errors that occur during message processing; and business events, which capture data related to key performance indicators. A flow refers to a particular group of processors that are linked together to route a message.

Unit testing on an API is typically designed in order to isolate a particular flow (or a subflow) and verify its functionality. If the flow exposes an interface, any request data or external calls or dependencies are typically mocked in order to provide anticipated behaviors during testing. One skilled in the relevant arts will appreciate that while mocks are principally discussed herein, other types of mocking approaches, including fakes and stubs, can be used as well without the scope of this disclosure.

Writing a unit test is typically accomplished manually with either a visual editor or a text editor for editing extensible markup language (XML) documents. The resulting unit test code allows a developer to isolate a flow typically by creating mocked behavior for message processors that should produce predictable behaviors in order to test specific functionality. A mocked message processor can be defined, by way of non-limiting example, by specifying a message processor to mock, a mocked behavior using attributes, and a payload for a mock response.

Additionally, a unit test can be written to spy the contents of messages being passed in and out of message processors. By spying message attributes before and after a message processor is called, it is possible to validate that the behavior of the message processor is as expected. By way of non-limiting example, spying message attributes can be accomplished by defining assertions that must be true of the attributes before the call, assertions that must be true of the attributes after the call, or both. If the assertions fail, then a corresponding action may be specified, such as notifying the developer that the assertion has failed.

More complex combinations of mocks and spy behavior can include creating a mock and spying its message inputs. The outputs of a mock would not need to be spied as this would be testing the behavior of the mock, and not an actual flow.

A unit test can also be used to verify external calls made to a message processor. Separate from spying message attributes prior to calling the message processor, a verify operation can be defined in order to test whether a message processor has been called (e.g., called exactly N times, called at least N times, called at most N times, etc.) and the attributes and their values that were provided as payload to the message processor. A unit test can also be written to assert the contents of a payload, confirming that the payload has an expected value and producing an error if it does not.

As previously mentioned, a given unit test typically tests a single flow at a time in order to ensure correct operation of that flow. And also as previously noted, mocks can be used to essentially "black box" any message processors that are not themselves being tested. In conjunction with this, it is possible to define messages being passed to message processors directly by setting a message payload to specific contents. For example, a payload can be set by defining keys for properties being set, and corresponding values for those keys.

The above unit test behaviors can be defined by special message processors used specifically in the creation of unit tests. More particularly, in accordance with an embodiment, it is possible to simulate a specific behavior for a message processor with a Mock Message Processor; lay out a message using a Set Message Processor; define a verification to validate a message processor's call with a Verify Message Processor; inspect the status of a message before and after it reaches certain Message Processor through a Spy Message Processor; and validate the content and status of a message with an Assert Message Processor.

While the above framework allows for the building of automated unit tests for integrations and APIs, the creation of such tests can be challenging and require a significant amount of manual development. Different types of developers, with different skillsets each, may at times need to test API functionality. For example, the developers of the underlying integration or API will likely need to generate unit tests to validate their work. While these users are very familiar with the functionality they have coded and can therefore understand the complexities of testing their code, it is nevertheless beneficial to have a way to quickly generate unit tests to allow for greater testing coverage in a shorter amount of time. Separately, testers charged with quality assurance (QA) for continuous integration and continuous delivery (CI/CD) of the application are familiar with success and stability criteria that need to be met before a general public release, and while they can typically code a unit test, they may not be intimately familiar with the manner in which the application was built and therefore would encounter additional hurdles in developing the unit test.

Instead, it is possible to use a test recorder to simplify the creation of unit tests. With the disclosed test recorder, input and output events can be listened to, which include payload, attributes, and variables. And with the disclosed test recorder, a test can be automatically generated using a recorded flow, with a user's own mocks and assertions.

FIG. 1 is an exemplary user interface (UI) 100 depicting initiation of a test recorder, in accordance with an embodiment. As shown in UI 100, an API implementation has been loaded and a message flow for testing is selected. In this case and throughout the examples in this disclosure, the exemplary message flow is named "getFlights" and is used to obtain flight information for a requested airline. The general outline in this example is that the airline is specified in a call to the getFlights flow, and a corresponding message processor for that airline (allowing for the proper interface to that airline's flight information system) is called with any additional parameters (e.g., a destination parameter). UI 100 provides an option for a test to be recorded on this exemplary flow as option 102.

Figure 2:
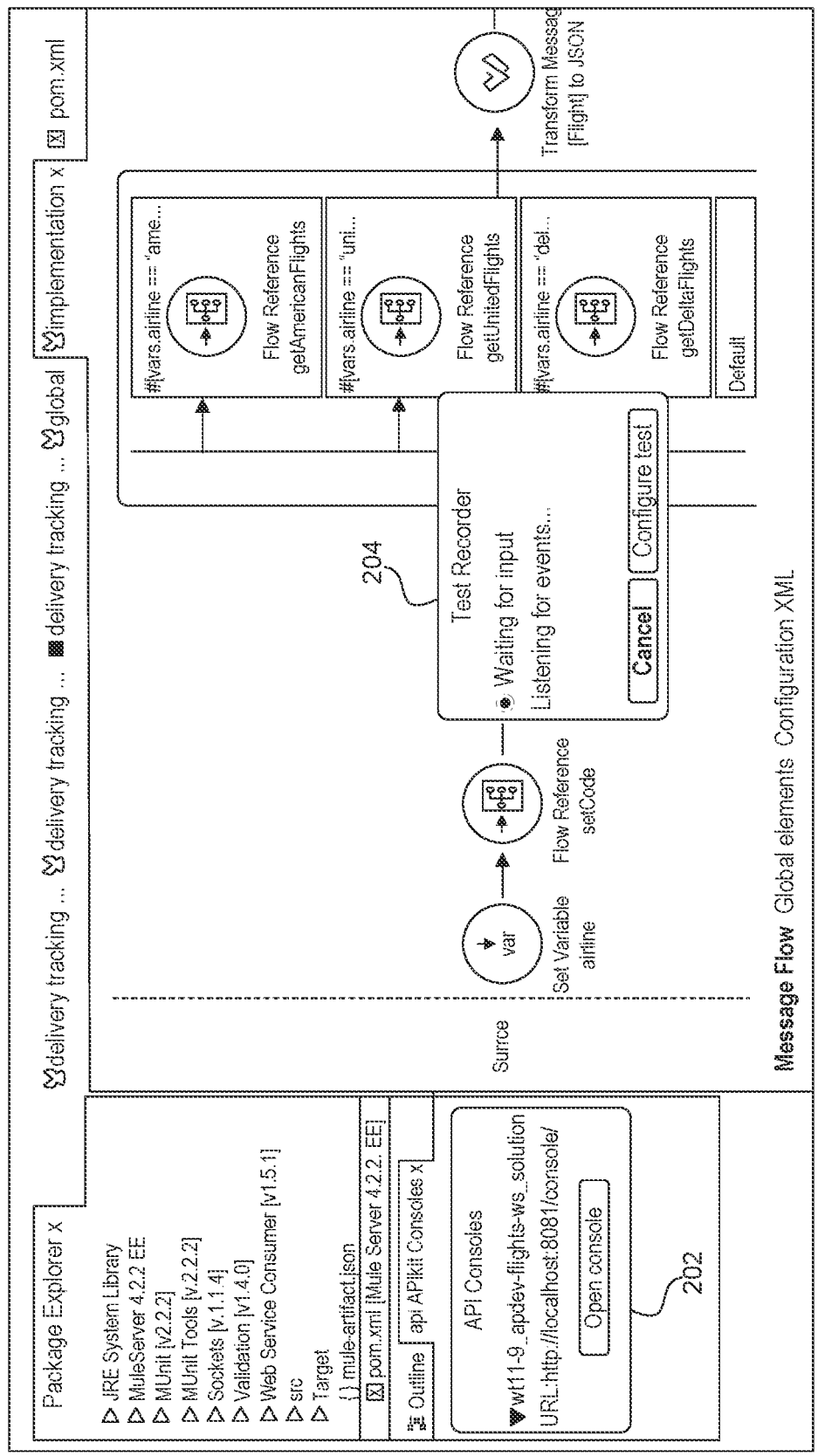
FIG. 2 is an exemplary UI depicting execution of the test recorder, in accordance with an embodiment.

FIG. 2 is an exemplary UI 200 depicting execution of the test recorder, in accordance with an embodiment. In UI 200, a modal 204 appears indicating that the test recorder is listening, and waiting for input. While the test recorder is listening, a developer may then open a console with open console button 202 in order to interact with the API under test and provide an input, in accordance with an embodiment.

Figure 3:
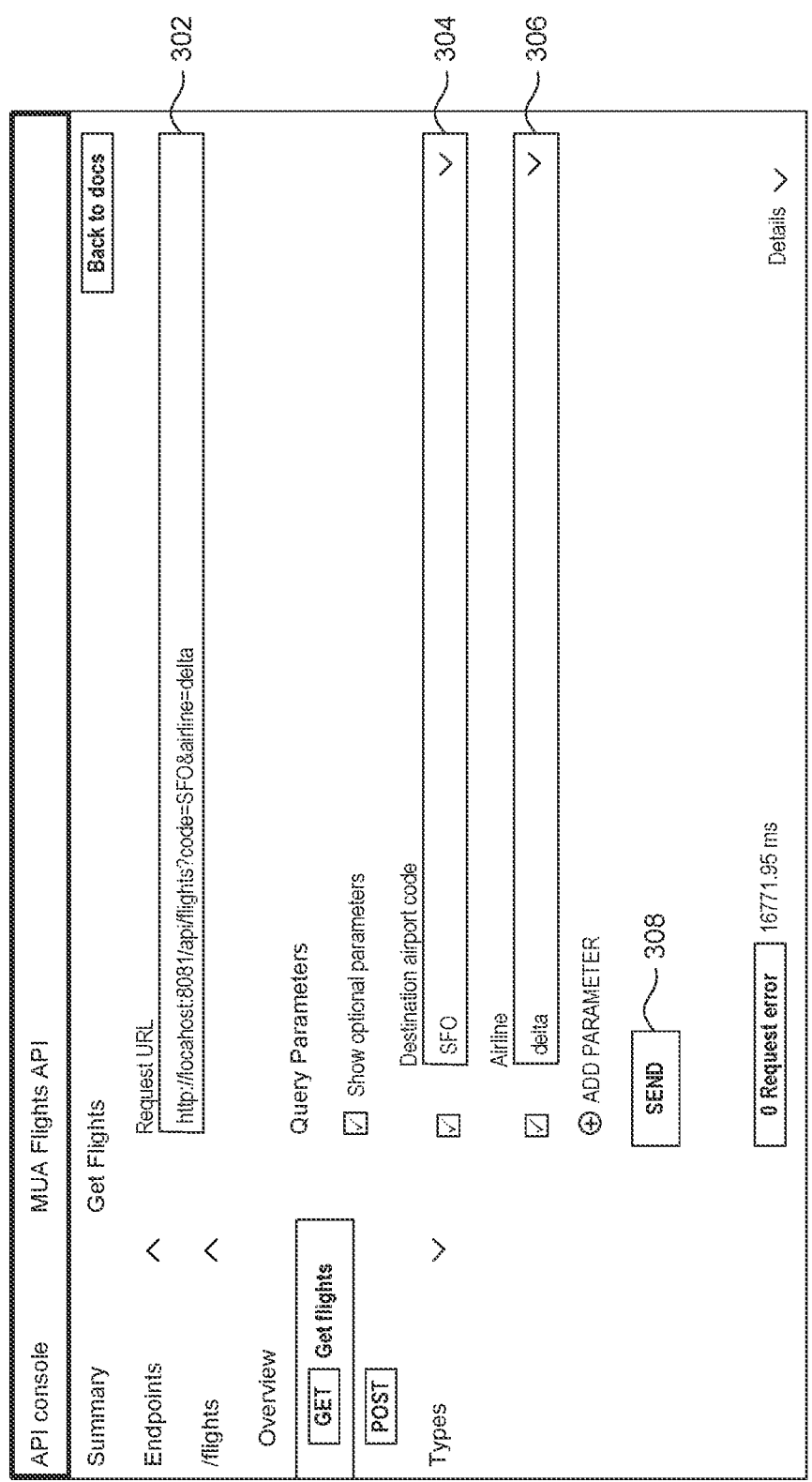
FIG. 3 is an exemplary UI depicting an API console used to execute an application under test with a desired set of query parameters as inputs, in accordance with an embodiment.

FIG. 3 is an exemplary UI 300 depicting an API console used to execute an application under test with a desired set of query parameters as inputs, in accordance with an embodiment. UI 300 includes a request URL 302, which shows a fully constructed request made to the application with any parameters being passed. A query parameters section of UI 300 allows a developer to select specific parameters to include, in this case "destination airport code" parameter 304 (set as "SFO" in this example) and "airline" parameter 306 (set as "delta" in this example). The test recorder will then listen to input and output events, including payload, attributes, and variables, for the flow that has been called with these specified parameters.

Figure 4:
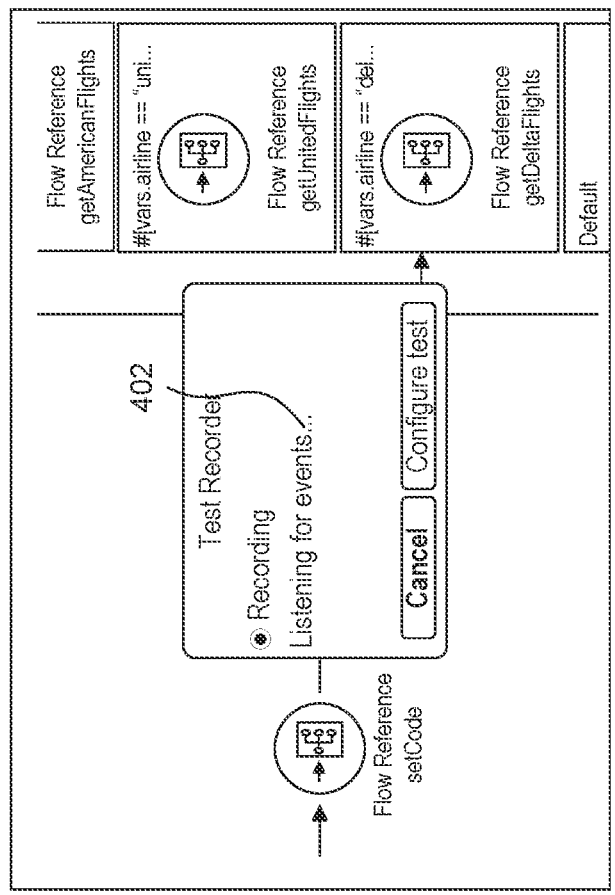
FIG. 4 is an exemplary UI depicting a recording state of the test recorder, in accordance with an embodiment.
Figure 5:
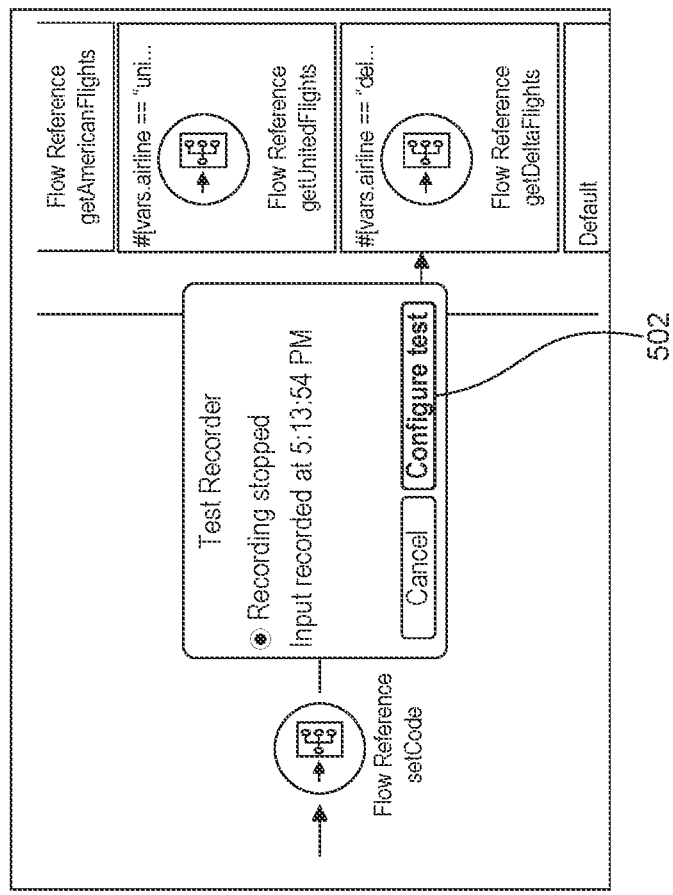
FIG. 5 is an exemplary UI depicting a completed state of the test recorder, in accordance with an embodiment.

FIG. 4 is an exemplary UI 400 depicting a recording state of the test recorder, in accordance with an embodiment. In an embodiment, a modal box 402 (corresponding to modal box 204 of FIG. 2) indicates that the test recorder is now monitoring the specified input event pass through execution of the flow. FIG. 5 is an exemplary UI 500 depicting a completed state of the test recorder, in accordance with an embodiment. With the entire flow executed from input to response, a framework for a unit test has been generated. A developer may indicate a desire to configure the unit test by selecting configure test button 502.

FIG. 6 is an exemplary UI 600 depicting a test configuration dialog, in accordance with an embodiment. UI 600 includes a recorded outline 602 of the tested flow, and a configuration options menu 604, in accordance with an embodiment. For example, outline 602 shows each of the message processors involved in implementing the getFlights flow, such as setting a variable for the airline parameter passed to the application when called, and using the airline parameter to choose a getDeltaFlights message processor (since the test was generated specifically for that airline). One skilled in the relevant arts will appreciate that a different tested flow for the getFlights flow can be generated based on the calling parameters.

In UI 600, the overall flow is selected in outline 602, such that configuration options menu 604 shows tests that can be produced for the flow as a whole. In options menu 604, a developer can easily configure a flow input and a flow output, in accordance with an embodiment. Any configuration information in the flow input box is handled as a set operation, and in this case is prepopulated based on the recorded input. And the configuration information in the flow output box is provided as an assertion, prepopulated with the results of the recorded output.

As a developer clicks through processors in outline 602, options menu 604 adjusts to show relevant options for each selected processor. Each different type of processor has different testing actions that are shown in options menu 604, depending on what the processor does. Options menu 604 is prepopulated with data that is captured in the execution of the flow.

FIG. 7 is an exemplary UI 700 depicting a configuration of a set variable message processor, in accordance with an embodiment. Outline 702 again shows the execution outline for the tested flow, but this time the airline processor (a set variable processor type) is selected by the developer, and corresponding test actions for this processor type are shown in options menu 704.

From options menu 704 in this case (based on the processor type being a set variable processor type), the developer can mock the processor, verify calls to the processor, or spy the processor, in accordance with an embodiment. One skilled in the relevant arts will appreciate that these options correspond to those that could be manually constructed for this processor type as previously described. By selecting one of these possible actions, corresponding settings for the action can be specified. For example, as shown in action settings 706, a developer may verify that the message processor is called a certain number of times. In the case of this exemplary flow, the airline variable should be set exactly once during execution of the flow, so the developer may wish to create a verify call action to produce an error message if the message processor is not called exactly once during execution. This would allow the developer to quickly determine error conditions such as the processor being skipped (called zero times) or being called repeatedly (twice or more).

Figure 8:
FIG. 8 is an exemplary UI depicting a configuration of a transform message processor, in accordance with an embodiment.

FIG. 8 is an exemplary UI 800 depicting a configuration of a transform message processor, in accordance with an embodiment. Outline 802 again shows the execution outline for the tested flow, but this time the [Flight] to JSON processor (a transform message processor type) is selected by the developer, and corresponding test actions for this processor type are shown in options menu 804.

From options menu 804 in this case (based on the processor type being a transform message processor type), the developer can verify calls to the processor, or spy the processor, in accordance with an embodiment. One skilled in the relevant arts will appreciate that these options correspond to those that could be manually constructed for this processor type as previously described. By selecting one of these possible actions, corresponding settings for the action can be specified. For example, as shown in action settings 806, a developer may spy on individual inputs to and outputs from the processor in order to check if the data matches specified conditions. From here, the developer may specify assertions on the inputs and outputs, which would generate errors if not satisfied during testing.

FIG. 9 is an exemplary UI 900 depicting a summary page of a generated test configured from a test recording, in accordance with an embodiment. From here, a developer can quickly view actions specified by a developer in the configuration options. In accordance with an embodiment, the actions can be organized into categories, corresponding to behavior, execution, and validation actions. If the developer agrees with the summary, they may proceed to generate the test. The test is then constructed according to the configured settings, as specified above.

While the foregoing generation of a test using the test recorder was built around a single execution of a flow, it is possible to execute multiple flows and view them concurrently, thereby configuring and building multiple unit tests concurrently. In the particular example discussed above, the airline parameter was given as 'delta' for the test, but the test could be rerun with, for example, other airlines as parameters, and multiple unit tests generated from each of these variations. Ideally, as many scenarios as possible are tested in order to fully validate the application.

Figure 10:
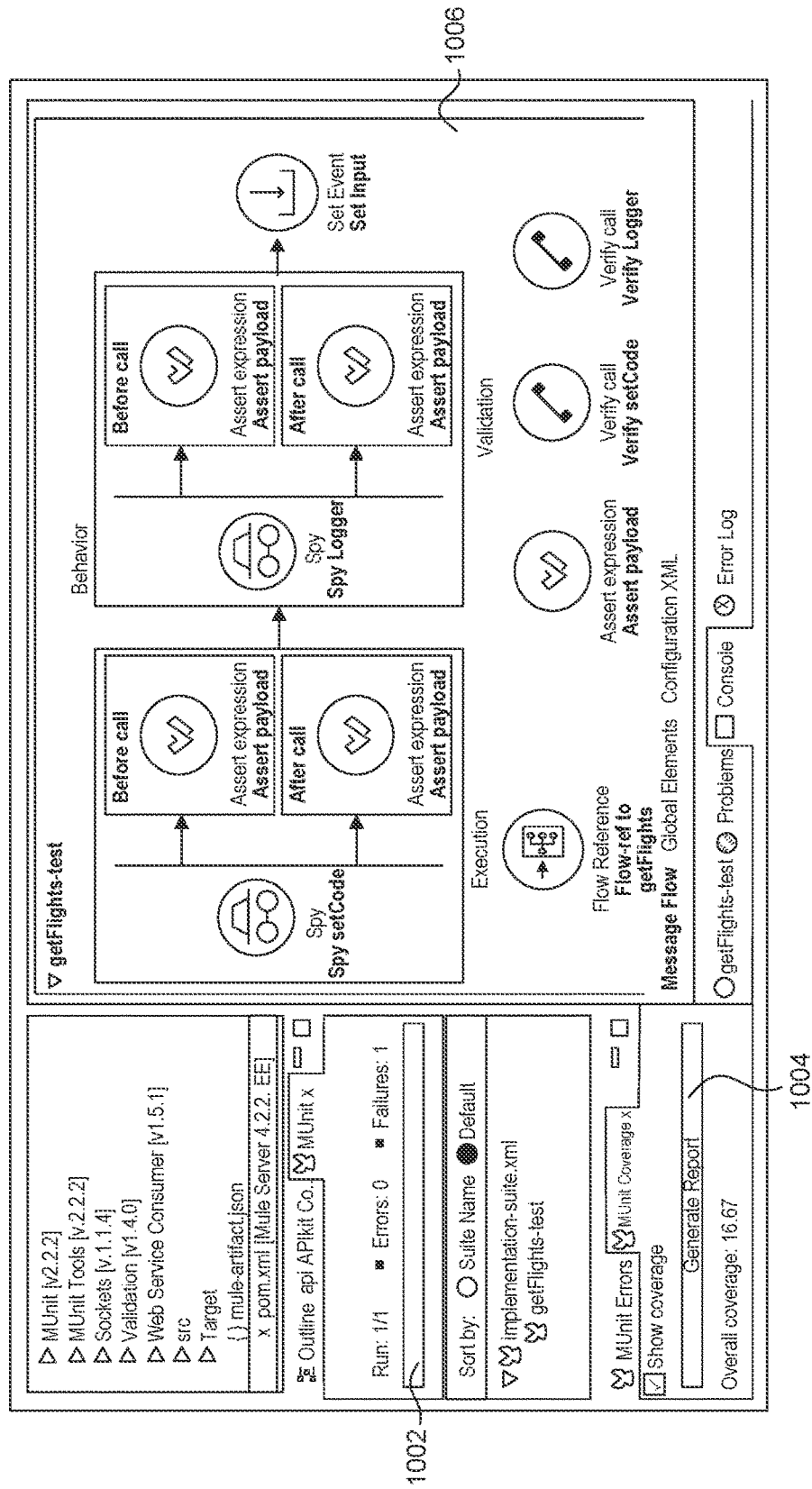
FIG. 10 is a UI depicting a unit test and information about the unit test, in accordance with an embodiment.

In order to appreciate the extent to which these tests fully validate the application, reports can be generated that show various insights into coverage of the application in testing. FIG. 10 is a UI 1000 depicting a unit test and information about the unit test, in accordance with an embodiment. A visual representation 1006 of the unit test constructed by the disclosed process is rendered for aiding a developer in understanding what is being monitored by the test. Visual representation 1006 is organized into categories, as with the above summary, in accordance with an embodiment. Additional insights include an error summary 1002 indicating any errors identified during testing from the various behavior, execution, and validation message processors used for testing. UI 1000 also includes a generate report button 1004 that is used to request a coverage report, in accordance with an embodiment.

Figure 11:
FIG. 11 is a UI depicting a coverage report, in accordance with an embodiment.

FIG. 11 is a UI 1100 depicting a coverage report, in accordance with an embodiment. The coverage report can be produced, for example, at a developer's request such as by selection of generate report button 1004 of FIG. 10. The coverage report shown in UI 1100 shows weighted coverage for various resources of an application, in accordance with an embodiment. A coverage percentage for a resource is determined based on a number of containers within a resource that are addressed within a test flow, and an overall application coverage percentage is based on weighting the individual resource coverage percentages together, in accordance with an embodiment. One skilled in the relevant arts will appreciate that other approaches to calculating coverage can be used.

By visualizing coverage in a coverage report, a developer may be able to determine which other flows to generate tests for, and can rapidly achieve a high level of coverage using the test recorder to generate additional tests.

Figure 12:
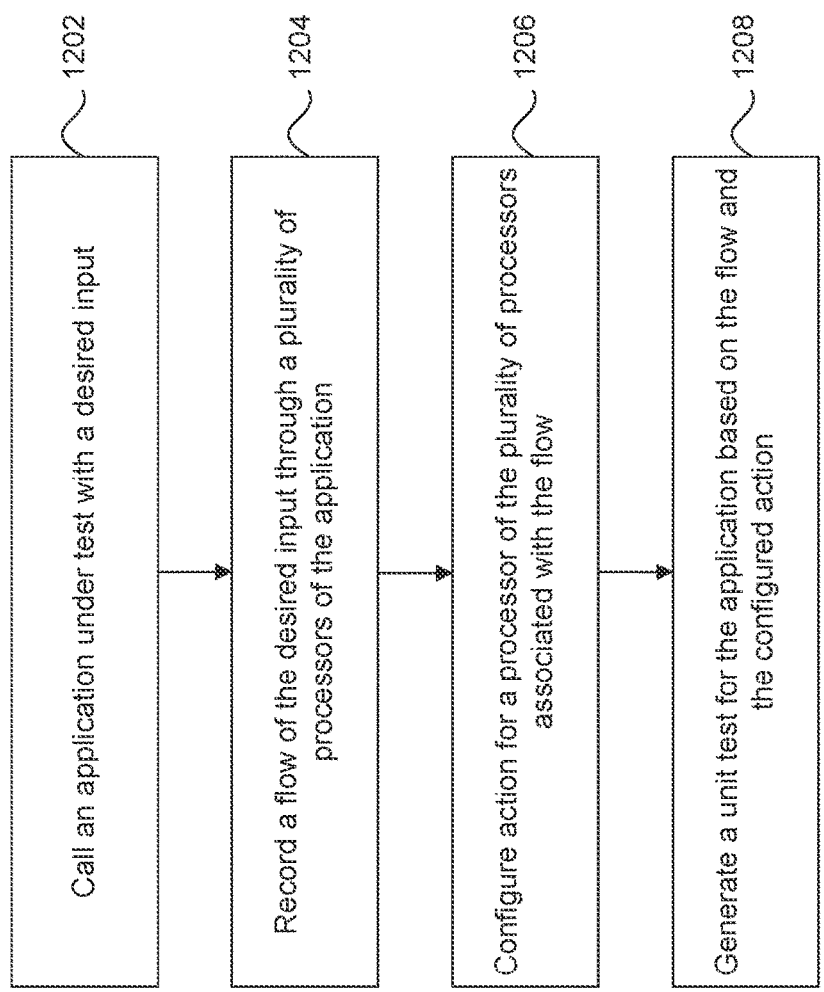
FIG. 12 is a flowchart illustrating steps by which a unit test is generated using a test recorder, in accordance with an embodiment.

In sum, the test recorder simplifies the generation of a unit test and its configuration. FIG. 12 is a flowchart illustrating steps by which a unit test is generated using a test recorder, in accordance with an embodiment. At step 1202, an application under test is called with a desired input (e.g., input parameters as specified in UI 300 of FIG. 3). At step 1204, a flow of the desired input through a plurality of processors of the application is recorded (e.g., as described above with relation to UI 400 of FIG. 4 and UI 500 of FIG. 5).

At step 1206, an action is configured for a processor of the plurality of processors associated with the flow. As described above with regard to UI 600 of FIG. 6, a processor within the flow can be selected and configured, and UI 600 presents processors for selection in a visual outline of the flow. UI 700 of FIG. 7 and UI 800 of FIG. 8 provide additional configuration options for a processor within the flow.

Then, at step 1208, a unit test is generated for the application based on the flow and the configured action.

Figure 13:
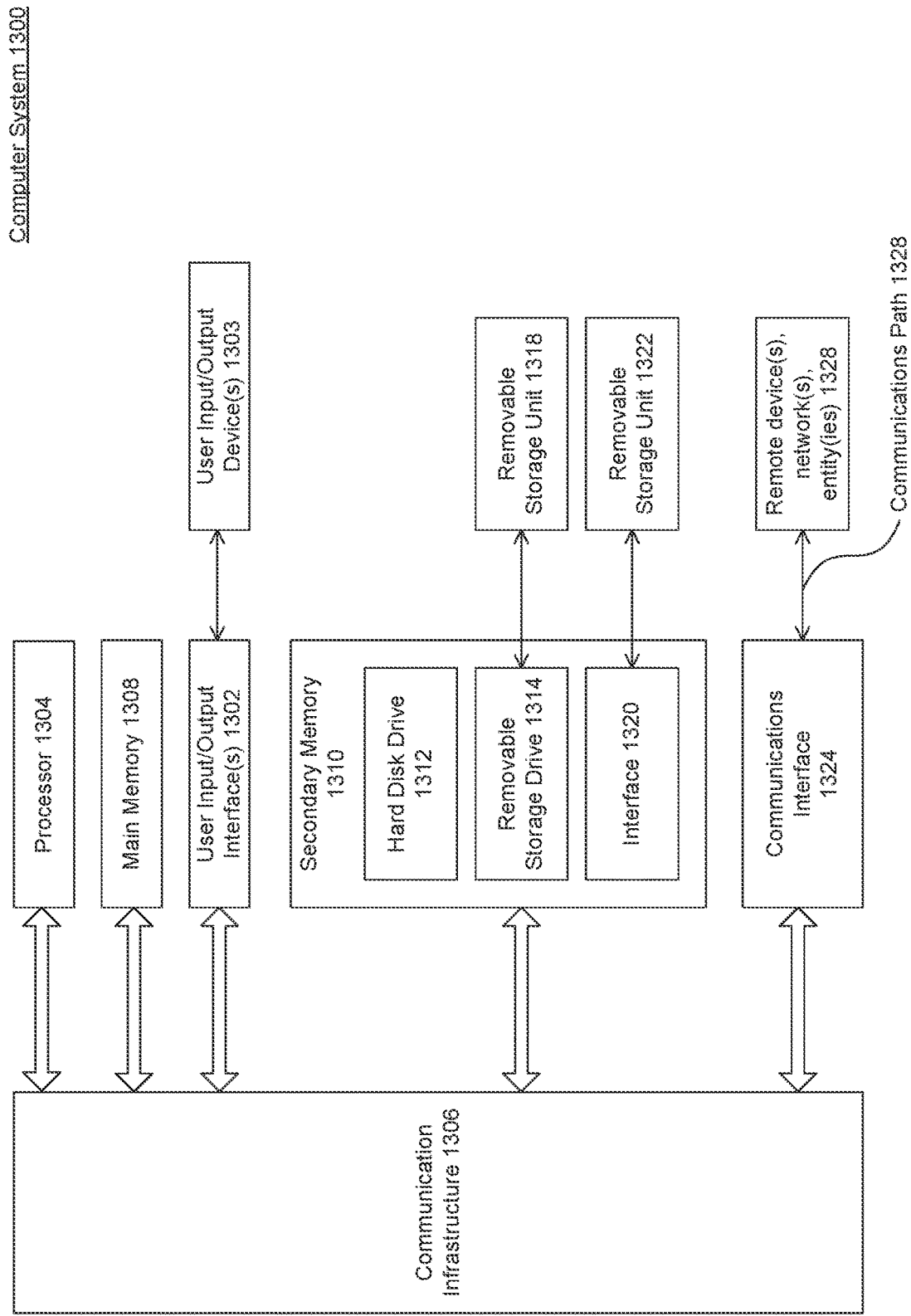
FIG. 13 is an example computer system useful for implementing various embodiments.

Various embodiments may be implemented, for example, using one or more well-known computer systems, such as computer system 1300 shown in FIG. 13. One or more computer systems 1300 may be used, for example, to implement any of the embodiments discussed herein, as well as combinations and sub-combinations thereof.

Computer system 1300 may include one or more processors (also called central processing units, or CPUs), such as a processor 1304. Processor 1304 may be connected to a communication infrastructure or bus 1306.

Computer system 1300 may also include customer input/output device(s) 1303, such as monitors, keyboards, pointing devices, etc., which may communicate with communication infrastructure 1306 through customer input/output interface(s) 1302.

One or more of processors 1304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1300 may also include a main or primary memory 1308, such as random access memory (RAM). Main memory 1308 may include one or more levels of cache. Main memory 1308 may have stored therein control logic (i.e., computer software) and/or data.

Computer system 1300 may also include one or more secondary storage devices or memory 1310. Secondary memory 1310 may include, for example, a hard disk drive 1312 and/or a removable storage device or drive 1314. Removable storage drive 1314 may be a floppy disk drive, a magnetic tape drive, a compact disk drive, an optical storage device, tape backup device, and/or any other storage device/drive.

Removable storage drive 1314 may interact with a removable storage unit 1318. Removable storage unit 1318 may include a computer usable or readable storage device having stored thereon computer software (control logic) and/or data. Removable storage unit 1318 may be a floppy disk, magnetic tape, compact disk, DVD, optical storage disk, and/ any other computer data storage device. Removable storage drive 1314 may read from and/or write to removable storage unit 1318.

Secondary memory 1310 may include other means, devices, components, instrumentalities or other approaches for allowing computer programs and/or other instructions and/or data to be accessed by computer system 1300. Such means, devices, components, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1300 may further include a communication or network interface 1324. Communication interface 1324 may enable computer system 1300 to communicate and interact with any combination of external devices, external networks, external entities, etc. (individually and collectively referenced by reference number 1328). For example, communication interface 1324 may allow computer system 1300 to communicate with external or remote devices 1328 over communications path 1326, which may be wired and/or wireless (or a combination thereof), and which may include any combination of LANs, WANs, the Internet, etc. Control logic and/or data may be transmitted to and from computer system 1300 via communication path 1326.

Computer system 1300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1300, main memory 1308, secondary memory 1310, and removable storage units 1318 and 1322, as well as tangible articles of manufacture embodying any combination of the foregoing. Such control logic, when executed by one or more data processing devices (such as computer system 1300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 13. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   executing, by one or more computing devices, an application under test;
   calling, by the one or more computing devices, the application under test with a desired input;
   recording, by the one or more computing devices, a flow of the desired input through a plurality of processors of the application under test, wherein one or more processors of the plurality of processors are individually selectable in an outline for the flow;
   configuring, by the one or more computing devices, an action for a processor of the plurality of processors associated with the flow; and
   generating, by the one or more computing devices, a unit test for the application under test based on the flow and the configured action.

2. The method of claim 1, further comprising:
   presenting, by the one or more computing devices, the flow as the outline of the plurality of processors of the application under test.

3. The method of claim 2, wherein each processor of the plurality of processors is selectable in the outline, further comprising:
   presenting, by the one or more computing devices, a configuration option corresponding to the processor of the plurality of processors based on the processor of the plurality of processors being selected in the outline, wherein the configuration option specifies the configured action.

4. The method of claim 1, wherein the action comprises an assertion on a message payload.

5. The method of claim 1, wherein the action comprises a verification that the processor of the plurality of processors was called a specified number of times.

6. The method of claim 1, wherein the action comprises spying a payload of the processor of the plurality of processors.

7. The method of claim 1, further comprising:
   recording, by the one or more computing devices, an additional flow of an additional desired input through an additional plurality of processors of the application under test; and
   presenting, by the one or more computing devices, the flow and the additional flow together as outlines of the plurality of processors and the additional plurality of processors of the application under test.

8. A system, comprising:
   a memory configured to store operations; and
   one or more processors configured to perform the operations, the operations comprising:
   executing an application under test,
   calling the application under test with a desired input,
   recording a flow of the desired input through a plurality of processors of the application under test, wherein one or more processors of the plurality of processors are individually selectable in an outline for the flow,
   configuring an action for a processor of the plurality of processors associated with the flow, and
   generating a unit test for the application under test based on the flow and the configured action.

9. The system of claim 8, further comprising:
   presenting the flow as the outline of the plurality of processors of the application under test.

10. The system of claim 9, wherein each processor of the plurality of processors is selectable in the outline, further comprising:
    presenting a configuration option corresponding to the processor of the plurality of processors based on the processor of the plurality of processors being selected in the outline, wherein the configuration option specifies the configured action.

11. The system of claim 8, wherein the action comprises an assertion on a message payload.

12. The system of claim 8, wherein the action comprises a verification that the processor of the plurality of processors was called a specified number of times.

13. The system of claim 8, wherein the action comprises spying a payload of the processor of the plurality of processors.

14. The system of claim 8, further comprising:
    recording an additional flow of an additional desired input through an additional plurality of processors of the application under test; and
    presenting the flow and the additional flow together as outlines of the plurality of processors and the additional plurality of processors of the application under test.

15. A non-transitory, computer-readable storage medium having instructions stored thereon, execution of which, by one or more processing devices, causes the one or more processing devices to perform operations comprising:
    executing an application under test;
    calling the application under test with a desired input;
    recording a flow of the desired input through a plurality of processors of the application under test, wherein one or more processors of the plurality of processors are individually selectable in an outline for the flow;
    configuring an action for a processor of the plurality of processors associated with the flow; and
    generating a unit test for the application under test based on the flow and the configured action.

16. The non-transitory, computer-readable storage medium of claim 15, the operations further comprising:
    presenting the flow as the outline of the plurality of processors of the application under test.

17. The non-transitory, computer-readable storage medium of claim 16, wherein each processor of the plurality of processors is selectable in the outline, the operations further comprising:
    presenting a configuration option corresponding to the processor of the plurality of processors based on the processor of the plurality of processors being selected in the outline, wherein the configuration option specifies the configured action.

18. The non-transitory, computer-readable storage medium of claim 15, wherein the action comprises an assertion on a message payload.

19. The non-transitory, computer-readable storage medium of claim 15, wherein the action comprises a verification that the processor of the plurality of processors was called a specified number of times.

20. The non-transitory, computer-readable storage medium of claim 15, wherein the action comprises spying a payload of the processor of the plurality of processors.

\* \* \* \* \*